May 26, 1970     R. C. KINSELL     3,513,881
FLOW REGULATOR HAVING THRUST RECOVERY
Filed July 24, 1967     2 Sheets-Sheet 1
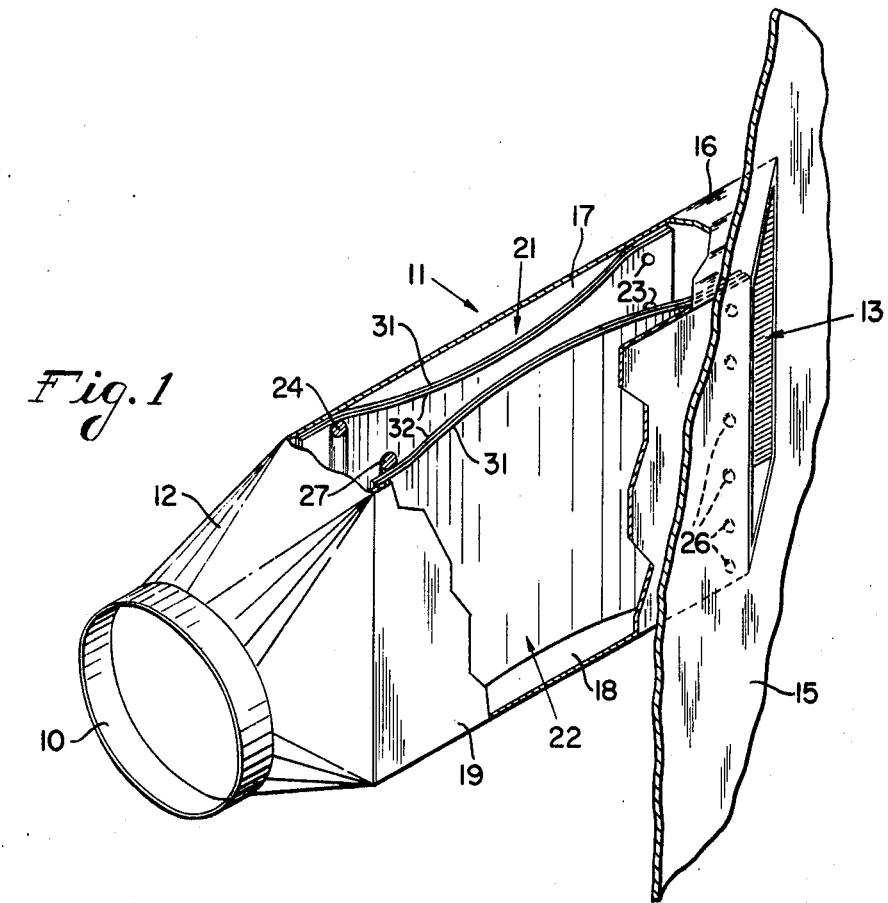
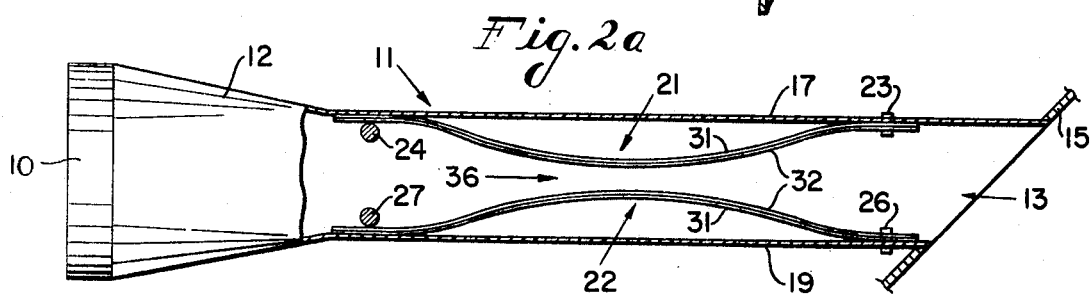
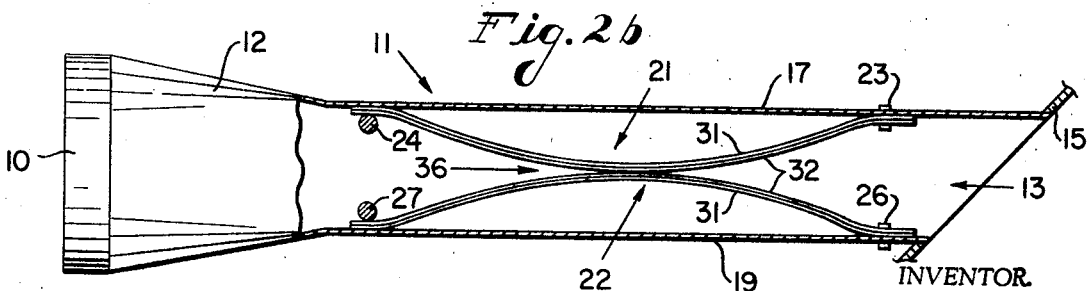
INVENTOR.
ROBERT C. KINSELL
BY *Dominick Wardell*
ATTORNEY May 26, 1970     R. C. KINSELL     3,513,881
FLOW REGULATOR HAVING THRUST RECOVERY
Filed July 24, 1967     2 Sheets-Sheet 2
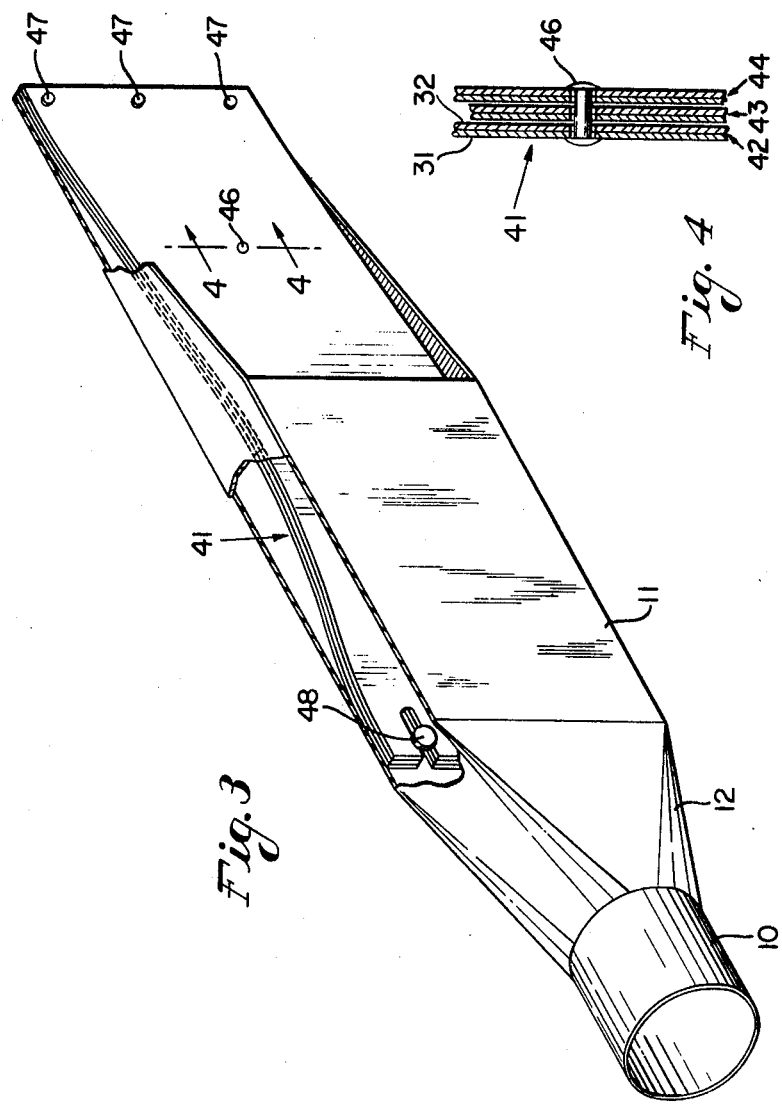
INVENTOR.
ROBERT C. KINSELL
BY *Dominich Nardelli*
ATTORNEY United States Patent Office 3,513,881
Patented May 26, 1970

3,513,881
FLOW REGULATOR HAVING THRUST RECOVERY
Robert C. Kinsell, Los Angeles, Calif., assignor to The Garrett Corporation, Los Angeles, Calif., a corporation of California
Filed July 24, 1967, Ser. No. 655,636
Int. Cl. F15d 1/02; G05d 7/01, 23/08
U.S. Cl. 138—45                                   1 Claim

ABSTRACT OF THE DISCLOSURE

A flow regulator having thrust recovery which utilizes thermal expansion of dissimilar metals to change the curvature in bimetallic sheets to vary the throat in relation to temperature at the same time a streamlined passageway is maintained so that the flowing fluid is maintained within a fixed temperature range and the friction losses are minimal.

---

This invention relates to a device for maintaining a relatively fixed temperature in a flowing fluid to which heat is being added, as in heat exchangers.

In many heat exchangers the fluid output temperature should preferably remain as near constant as possible in order that the unit may operate efficiently. For example, in an aircraft air conditioning system, the heat exchangers are designed so that cooling is available under the hottest conditions. The same unit, operating under mild conditions, would produce a temperature that is too cool for passenger comfort. In the past, devices have been installed to reduce or shut down the flow of cooling air, when the cooling requirements are relatively low. These devices introduced friction and drag into the system which degraded the performance of the aircraft.

Therefore, an object of this invention is to produce a fluid flow control device that introduces minimum friction or drag.

Another object of this invention is to produce a fluid flow control device that has a streamlined throat section wherein the throat area increases with increased fluid temperatures.

Another object of this invention is to produce a fluid flow control device having a streamlined throat section made of bimetallic sheets wherein the curvature of the sheets decrease as the fluid temperature increases to cause the throat area to increase and more fluid to flow.

Another object of this invention is to incorporate a thrust recovery means with the fluid flow control device when used on an aircraft.

Briefly, the novel flow regulator includes a substantially rectangular fluid duct means. The duct means has a rectangular section wherein at least one of the walls is made of a bimetallic sheet which has a curvature impressed thereon when the sheet is at a relatively low temperature. The sheet is disposed so that the convex surface faces the opposite wall. Since the metal on the concave side expands at a rate greater than the metal on the convex side as the temperature rises, the sheet tends to straighten as the temperature increases, increasing the throat area to allow more fluid to flow. Since the curvature is smooth, very little friction is introduced whereby a thrust is produced by the fluid leaving the device.

The foregoing and other objects, advantages and characterizing features of this invention will become apparent from the ensuing detailed description of the illustrative embodiment thereof, reference being made to the accompanying drawings wherein:

FIG. 1 is a pictorial view, with portions broken away, of one embodiment of a flow control device incorporating the features of this invention;

FIG. 2a is a partial longitudinal section of the device shown in FIG. 1 in the open position;

FIG. 2b is the same partial longitudinal section of the device in the closed position;

FIG. 3 is a pictorial view of another embodiment of the invention; and

FIG. 4 is a partial section taken on line 4—4 in FIG. 3.

Referring to the drawings and to FIG. 1 in particular, the flow regulator is shown having a round inlet 10, a rectangular section 11, and a transition section 12 therebetween. The outlet end of the rectangular section 11 may be attached to, for example, a fuselage 15 of an aircraft forming an outlet 13. The inlet 10 and duct sections 11 and 12 are made of, for example, steel sheets about $\frac{1}{16}$ of an inch thick as is common in the art. The rectangular section 11 includes four side walls 16, 17, 18 and 19 and two bimetallic sheets 21 and 22 disposed against opposite walls 17 and 19, respectively. Bimetallic sheet 21 is suitably fixed at one end to side wall 17, for example, with rivets 23. The other end of the bimetallic sheet is disposed between the wall 17 and a rod 24. The rod 24 is fixed to both oppositely disposed side walls 16 and 18 and sufficiently spaced from wall 17 so that the bimetallic sheet 21 could slide therebetween. Bimetallic sheet 22 is similarly attached to side wall 19 as bimetallic sheet 21 is attached to side wall 17. Rivets 26 rivet one end of the bimetallic sheet 22 to wall 19 and the other end is capable of sliding between the wall 19 and a rod 27. Like rod 24, rod 27 is fixed to both oppositely disposed walls 16 and 18 by suitable means, such as, spot welding (not shown).

Referring to FIGS. 2a and 2b the bimetallic sheets 21 and 22 are shown in two different positions in order to better explain the operation of the flow regulator. Each of the bimetallic sheets 21 and 22 is made of, for example, a copper strip 31 and a steel strip 32 suitably bonded together to provide relatively stiff bimetallic sheets. The bimetallic sheets should have sufficient stiffness so that they do not bend due to the pressure of the fluid. Also, when the two bonded metals are at a relatively low temperature they assume a curvature as shown in FIG. 2b wherein the throat area 36 is substantially closed. The copper strip 31 will expand more than the steel strip 32 as the temperature increases, and since the copper strip 31 is disposed on the concave side the bimetallic sheets will straighten out as the temperature increases. At a relatively higher temperature the throat area 36 is larger (FIG. 2a) than at a lower temperature (FIG. 2b).

The flow regulator could be used, for example, on an aircraft at the outlet of the cold-fluid side of a heat exchanger (not shown) that is part of the air conditioning system. Normally ram air is used to cool the heat exchanger. In this embodiment the flow of ram air would be controlled by coupling the air leaving the heat exchanger to the inlet 10. When the ram air temperature is relatively low the bimetallic sheets 21 and 22 would be in the position shown in FIG. 2b causing very little air to flow therethrough. When the cooling requirements increase, the temperature of the ram air leaving the heat exchanger tends to increase. Since hotter air is passing through the regulator the bimetallic sheets become straighter. This allows more air to pass to increase the cooling capacity of the heat exchanger. Since the throat area 36 of the regulator maintains a relatively good streamlined configuration in both the cold and hot conditions, relatively very little friction is introduced in the system and the energy of the ram air is used to recover thrust. Thrust is recovered by placing the regulator relative to the fuselage 15 so that the velocity of the exiting air is directed to the rear of the aircraft, producing a forward thrust in accordance with well-known principles.

Referring to FIG. 3, an embodiment is shown wherein the thrust recovery is enhanced. This embodiment also has a round inlet 10, a rectangular section 11 and a transition section 12 therebetween. The outlet end of the rectangular section is disposed as before at an angle with the axis of flow so that the regulator, when attached to the fuselage 15, directs the flow rearward to produce a forward thrust. In this embodiment a laminated bimetal assembly 41 is attached only to the longest wall of the rectangular section 11. The assembly 41 is made of, for example, three bimetallic sheets 42, 43 and 44 that are held together by a rivet 46, as shown in FIG. 4. The sheets are free to slide with respect to each other. Each one of the sheets is, for example, less than one-sixteenth of an inch thick and made of the copper strip 31 and the steel strip 32 bonded together. The sheets are made relatively thin so that small temperature changes produce relatively large changes in curvature. Therefore the sheets are laminated so that they would not deflex under pressures encountered in the system, i.e. higher pressures require laminates with more sheets. The assembly 41 is fixed to section 11 by rivets 47 at one end and are held against the section 11 at the other end in sliding relationship by rivets 48 of which one is shown.

The preferred embodiment of the invention has been described and various changes may be resorted to by one skilled in the art without departing from the spirit of the invention or the scope of the accompanying claim.

1. A fluid flow regulator having thrust recovery comprising:
   a duct through which fluid may flow, and
   a stiff member disposed within said duct and having its shape unaffected by fluid velocity or pressures under operating conditions,
   said stiff member having a curvature to form a streamlined throat section through which the fluid flows, and
   said member having the property wherein the curvature becomes straighter as its temperature increases to increase the area of the throat section while maintaining its stiffness,
   said stiff member comprised of a laminate made of a plurality of metallic sheets,
   each of said sheets being made of different metals where one of the sheets has a larger thermal expansion coefficient than the other sheets,
   said one sheet with the metal of higher thermal expansion coefficient being disposed on the concave side of the curvature, and
   said duct section having rectangular cross-section and an outlet disposed at an acute angle with the axis of flow,
   said laminate being fixed at one end to the longest wall of said duct section, and
   means being provided to hold the opposite end of said laminate against said longest wall in sliding relation therewith.

References Cited

UNITED STATES PATENTS 1,583,303   5/1926   Mertz.
2,598,208   5/1952   Bailey _____ 138—45

FOREIGN PATENTS 969,291   5/1950   France.

HERBERT F. ROSS, Primary Examiner

U.S. Cl. X.R.

236—93